(12) United States Patent
Leason et al.

(10) Patent No.: US 8,156,859 B2
(45) Date of Patent: Apr. 17, 2012

(54) MACHINE AND METHOD FOR MAKING SMORES

(75) Inventors: Melanie Leason, Chappaqua, NY (US); David Leason, Chappaqua, NY (US)

(73) Assignee: S'More Ventures LLC, Chappaqua, NY (US)

( * ) Notice: Subject to any disclaimer, the term of this patent is extended or adjusted under 35 U.S.C. 154(b) by 1034 days.

(21) Appl. No.: 11/967,119

(22) Filed: Dec. 29, 2007

(65) Prior Publication Data

US 2008/0156198 A1    Jul. 3, 2008

Related U.S. Application Data

(60) Provisional application No. 60/883,160, filed on Jan. 2, 2007, provisional application No. 60/909,486, filed on Apr. 2, 2007.

(51) Int. Cl.
*A47J 37/08* (2006.01)

(52) U.S. Cl. ............. 99/326; 99/353; 99/394; 99/421 R; 99/427; 426/103; 426/272; 426/660

(58) Field of Classification Search ............ 99/326, 99/353, 394, 421 R, 427; 426/272, 660, 426/103

See application file for complete search history.

(56) References Cited

U.S. PATENT DOCUMENTS

| | | | |
|---|---|---|---|
| 1,111,870 A | | 9/1914 | Spurgeon |
| 1,618,091 A | * | 2/1927 | Kaley ............................... 99/599 |
| 2,109,079 A | * | 2/1938 | Zeigler et al. ................ 126/41 R |
| 2,170,070 A | * | 8/1939 | Deleray ...................... 99/329 R |
| 2,232,400 A | | 9/1939 | Martin |
| 2,183,938 A | | 12/1939 | Lewis |
| 2,192,600 A | * | 3/1940 | Lurtz .......................... 126/388.1 |
| 2,487,651 A | | 11/1949 | Gudmundsen |
| 2,614,485 A | * | 10/1952 | Sinkwitz et al. ................ 99/404 |
| 3,277,846 A | * | 10/1966 | Kesselman ................... 99/450.2 |

(Continued)

FOREIGN PATENT DOCUMENTS

JP    09293766 A  *  11/1997

(Continued)

OTHER PUBLICATIONS

Spin Master Ltd., Hershey's S'mores Maker Instructions Manual, Jun. 13, 2006, http://replay.waybackmachine.org/20060613121746/http://www.spinmaster.com/files/instructions/Smores_Maker_IS.pdf.*

*Primary Examiner* — Tu B Hoang
*Assistant Examiner* — Brett Spurlock
(74) *Attorney, Agent, or Firm* — Leason Ellis LLP

(57) ABSTRACT

A machine for toasting a marshmallow loaded on a pick and concurrently melting at least a portion of a chocolate bar provided on a separate support. A housing has an internal heat source, a rotatable pick holder shaped to removably and securely receive a pick and support the marshmallow in proximity to the heat source, and a coupling to rotate a so engaged pick. The coupling can be a manual control gearingly coupled to the pick holder. A moveable cover can support the heat source and place it in proximity with a marshmallow-bearing portion of the pick when in a closed position yet move aside for loading and unloading ingredients. A method for making s'mores toasts marshmallows while actively melting chocolate and provides for selective rotation of the marshmallow within the housing during the toasting step by moving a control that is safely disposed exterior of the housing.

16 Claims, 13 Drawing Sheets

U.S. PATENT DOCUMENTS

| | | | |
|---|---|---|---|
| 3,403,027 A * | 9/1968 | Page et al. .................... 426/250 |
| 3,554,113 A * | 1/1971 | Page et al. .................... 99/534 |
| 3,744,403 A | 7/1973 | Castronuovo |
| 4,238,995 A * | 12/1980 | Polster .......................... 99/331 |
| 4,345,145 A * | 8/1982 | Norwood ...................... 219/492 |
| 4,579,028 A * | 4/1986 | Neidhardt ...................... 83/109 |
| 4,766,879 A * | 8/1988 | Freese .......................... 126/506 |
| 5,500,234 A | 3/1996 | Russo |
| 5,669,290 A * | 9/1997 | Natsumi et al. ............. 99/421 H |
| 5,778,766 A * | 7/1998 | Wang ............................ 99/326 |
| 5,906,052 A | 5/1999 | Harmon |
| 6,000,651 A * | 12/1999 | Zibret et al. ............... 241/282.1 |
| 6,009,796 A | 1/2000 | Larzik |
| 6,435,080 B1 * | 8/2002 | Zarlengo ...................... 99/510 |
| 6,564,705 B2 * | 5/2003 | Zarlengo ...................... 100/288 |
| 6,570,135 B2 * | 5/2003 | Gros et al. .................... 219/396 |
| 6,663,907 B1 * | 12/2003 | Pratolongo .................... 426/509 |
| 6,772,678 B2 * | 8/2004 | Choi et al. ...................... 99/331 |
| 6,877,232 B2 | 4/2005 | Harmon et al. |
| 6,913,012 B2 * | 7/2005 | Divett et al. ................. 126/21 A |
| 7,097,870 B2 | 8/2006 | Funk et al. |
| 2002/0126613 A1 * | 9/2002 | Tanaka et al. ................ 369/77.1 |
| 2003/0085312 A1 * | 5/2003 | Fleming ........................ 242/249 |
| 2004/0061345 A1 * | 4/2004 | Harmon et al. ................. 294/61 |
| 2006/0193967 A1 * | 8/2006 | Tucker .......................... 426/660 |
| 2007/0084304 A1 * | 4/2007 | Chung ........................... 74/348 |
| 2007/0272089 A1 * | 11/2007 | Asma .......................... 99/450.1 |

FOREIGN PATENT DOCUMENTS

JP          2005219823 A * 8/2005

* cited by examiner

MACHINE AND METHOD FOR MAKING SMORES

This patent application claims the benefit of priority from U.S. Provisional Application Ser. No. 60/883,160, filed Jan. 2, 2007, and U.S. Provisional Application Ser. No. 60/909,486, filed Apr. 2, 2007, both entitled MACHINE AND METHOD FOR MAKING S'MORES, both of which are hereby incorporated by reference in their respective entireties.

FIELD OF THE INVENTION

The present invention relates generally to food preparation, and more particularly to an appliance and method configured to prepare s'mores.

BACKGROUND OF THE INVENTION

A s'more is a dessert in which a roasted marshmallow is sandwiched between two pieces of graham cracker together with chocolate. S'more is a contraction of the phrase "some more," as may have been chanted at a campfire in the statement "I want s'more."

Traditionally, s'mores have been a treat prepared on camping trips. Campers scrounge the ground surrounding their campsites for long sticks suitable for skewering one or more marshmallows. The marshmallow-bearing end is then disposed above a campfire and is typically rotated until it browns or catches fire or drops into the fire (requiring replacement—if more marshmallows are available). Each camper's technique and skill will vary and the results are unpredictable. The goal is to heat the marshmallow until it becomes soft inside. The softened marshmallow can then be pinched from the stick between two graham crackers to form a sandwich.

In the traditional s'more, pieces or even slabs of chocolate are placed on one or both graham crackers, with the heat from the roasted marshmallow partially melting the chocolate. In a non-traditional s'more (or when there is no chocolate remaining), a toasted marshmallow can simply be sandwiched between two graham crackers.

Another fireside technique is to assemble and wrap the s'more ingredients in aluminum foil and place the wrapped package among the hot coals to melt and soften. This process can be less messy, but it does not brown the marshmallow or allow any control over the cooking process. Additionally, it is not as much fun.

Some restaurants have arranged table-top devices which include a Lazy Susan, a set of skewers and a central fire pot fueled by a flammable material such as Sterno. These devices simulate the campfire experience, in part, but the skewers and fire can be dangerous for home use.

A number of appliances have been devised over the years to toast marshmallows, yet none have been adapted or have suggested mechanisms that are particularly suited for preparing s'mores. For example: Castronuovo, U.S. Pat. No. 3,744,403, discloses an electric marshmallow toasting device which rotates marshmallow-supporting skewers; Spurgeon, U.S. Pat. No. 1,111,870, describes a gas-burner arrangement for toasting marshmallows mounted on rotating skewers; and Martin, U.S. Pat. No. 2,232,400, describes a marshmallow toaster configured to toast multiple marshmallows at once and discharge them through a chute into a box for sale to the public at fairs, expositions and the like. As well, there are a number of supports known in the art for supporting marshmallows including: U.S. Pat. Nos. 6,009,796; 6,877,232; 5,906,052; 2,487,651; and 2,183,938 and U.S. Publication No. 2004-0061345.

A "marshmallow system" is described in U.S. Pat. No. 6,800,312 which proposes a marshmallow having a cavity that contains chocolate inside. The chocolate within makes retaining the marshmallow on a skewer difficult and so this specially configured food product introduces new complexities if it were utilized to make a s'more. On the other hand, layered cereal bars have been proposed which combine several ingredients including those found in a s'more, together with a synthesized milk flavor, into a finished product, as exemplified by U.S. Pat. No. 7,097,870. See also U.S. Pat. No. 5,500,234.

As a departure from traditional approaches to making s'mores, the present invention provides a mechanism and method adapted to assist in preparing a cooked s'more using conventional ingredients (marshmallows, chocolate bars, and graham crackers), which is ready to eat free of any packaging.

SUMMARY OF THE INVENTION

Among more general aspects, the invention concerns a s'more machine having a heat source within a housing which is suitable for both toasting marshmallows and melting chocolate in furtherance of making a s'more sandwich. The machine includes a rotatable pick holder which is shaped to removably and securely receive a pick, which in turn is sized to support one or more marshmallows. A coupling in communication with the pick holder and operable to rotate any pick is engaged to the pick holder in proximity to the heat source. A second support surface is disposed so as to support a chocolate bar in proximity with the heat source within the housing. Any marshmallows on the pick are toasted by the heat source concurrently with an active melting of any chocolate bar on the second support surface into a softened or partially liquid state.

Also according to a general aspect of the invention, a method for making s'mores includes the steps of loading a marshmallow on a first support surface, mounting the first support surface for rotation within the housing in proximity with a heat source, disposing a graham cracker on a second support surface and a chocolate bar on the graham cracker, toasting the marshmallow while actively melting the chocolate using the heat source, and selectively rotating the first support surface mounted within the housing during the toasting step by moving a control that is gearingly coupled to the mount.

In one aspect, the invention concerns a machine having a housing, a heat source within the housing and providing heat in an insulated manner therein, a rotatable pick holder shaped to removably and securely rotate a pick having a marshmallow-bearing end disposed in proximity to the heat source, a second support surface different than the pick shaped to support chocolate in proximity to the heat source such that any marshmallows on the pick are toasted by the heat source concurrently with an active melting of any chocolate on the second support surface, and a control disposed exterior of the housing and gearingly coupled to the pick holder for rotating the pick holder and any pick secured thereto within the housing.

The second support surface can be shaped or sized to support a graham cracker below the chocolate. An optional further feature adds a failsafe mechanism to extinguish any burning of the marshmallow.

In another aspect, the invention concerns a method that includes the steps of loading ingredients onto respective support surfaces, the ingredients including a marshmallow on a first of the support surfaces and chocolate on a second of the support surfaces, causing at least one of the loaded ingredients to be in proximity with a heat source by relative movement therebetween, toasting the marshmallow while actively melting the chocolate, selectively rotating the first support surface within the housing during the toasting step by moving a control that turns the marshmallow on the first support surface through an engagement of at least one gear, and moving the toasted and melted ingredients to an unloading position remote from the heat source.

The foregoing aspects can be enhanced through automated mechanisms to effect movement of the support surfaces, the heat source, or both.

These and other aspects, features and advantages of the invention can be appreciated from the accompanying drawing figures and description of several illustrative embodiments.

DETAILED DESCRIPTION OF SEVERAL ILLUSTRATIVE EMBODIMENTS

By way of overview and introduction, the present invention concerns appliances for use in a kitchen that can provide tasty s'mores treats in a convenient, specially adapted manner. Several embodiments are disclosed.

A machine constructed in accordance with one embodiment of the invention includes a housing, preferably provided with a window for visual inspection of a marshmallow as it is toasted, a heat source disposed within the housing, a mechanism configured to transport a marshmallow into and out of proximity of the heat source and a second mechanism for movement of a first cookie substrate (preferably a graham cracker), chocolate, or both, into and out of proximity of the heat source. Preferably, the second mechanism is arranged so as to position the graham cracker and/or chocolate adjacent the heat source during the marshmallow toasting operation. This embodiment is described with reference to FIGS. 2 and 3A through 4B.

A machine constructed in accordance with the invention alternatively can have the heat source moveable in and out of proximity with a marshmallow support element. This embodiment is described with reference to FIG. 5.

In yet another embodiment, a machine constructed in accordance with the invention can have the marshmallow support mounted in a fixed position adjacent the heat source, for rotation in that position, with the graham cracker/chocolate support tray slideably moveable or statically positioned. Preferably, the user is shielded from contact with the heat source when the ingredients are loaded or removed from the machine. This embodiment is described with reference to FIGS. 6A and 6B.

Further structural features can be provided to enhance the efficiency and safety of the machine, while in some cases reducing the complexity of the process of making the s'more, as described below.

Figure 1:
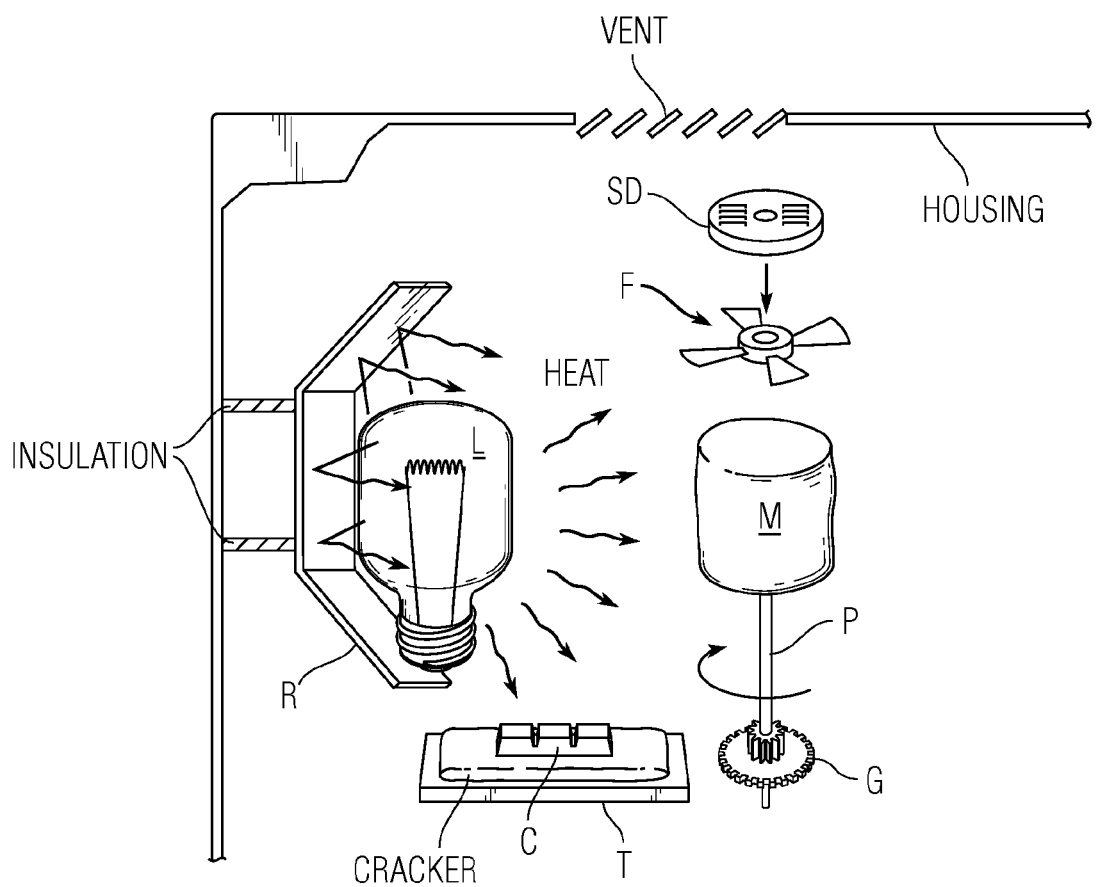
FIG. 1 is a schematic diagram of certain components included in a heating compartment of an embodiment of a machine which can be constructed in accordance with the invention.

FIG. 1 is a conceptual sketch showing a toasting operation and structure suitable for performing same. A marshmallow M is shown supported on a marshmallow pick P. Preferably, the pick P is seated in a gear G. The gear G can be rotationally driven during the toasting operation to ensure even heating of the marshmallow. Concurrently, a chocolate melting operation can be performed by disposing chocolate in a pan on a tray T or upon a cracker (as illustrated).

The pick P can be integral with the gear and used repeatedly, or it can be temporarily mounted in a pick holder associated with the gear G for use in a limited number of toasting operation cycles (e.g., one). The pick holder can comprise a slot in the gear G, such as a central slot, or a slot in a boss projecting from the gear (as shown), or a clamp that is shaped or biased to retain the pick.

Mechanisms for rotationally driving gears and picks are described, for example, in U.S. Pat. No. 3,744,403, a marshmallow toasting device. In a presently preferred embodiment, rotation of the gear G is in response to movement of a manually-actuated control that is coupled to the gear (e.g., via a slideable rack). The gear coupling has a ratio so as to achieve a desired rate of rotation of the marshmallow M for a given movement of the mechanism that moves the gear G. Thus, if a motor is used to turn the gear G, then the ratio could be, for example, 1 turn every 4 seconds. As described below, the coupling of the gear G to a motive force can instead be through paddles that are spun by an air stream harnessed from a fan associated with the machine.

The toasting and melting operations can be performed using heat sources of a type that can be varied widely. The heat source is supported by the housing. Preferably, heat from the heat source is directed away from the housing. Vents can be provided to permit the heat source to ventilate exterior of the housing. Optionally, filters such as paper or charcoal varieties can be positioned (and also can be replaced after one or more uses) to absorb any smoke from an over-toasted marshmallow. Insulation elements such as posts can be positioned between the housing and the heat source to space the heat source from the housing and thereby prevent melting or other damage to the housing.

As illustrated, an incandescent lamp L giving off infrared radiation (known as a "heat lamp") is arranged with a reflector R to provide intense heat in proximity to the marshmallow M and chocolate C for a prescribed period of time which is sufficient to soften the marshmallow and/or chocolate and, more preferably, which is also sufficient to (1) toast an exterior of the marshmallow without causing the marshmallow to catch fire and (2) to partially melt the chocolate into a mixture that is part liquid and part solid. The tray supporting the chocolate is preferably disposed below the heat source. The heat source can be positioned alongside the marshmallow M, above it or below it. A particular placement for the heat source may be suggested by its type. For example, using a lamp as the heat source permits use alongside the marshmallow M, as shown. Using a gas burner as the heat source may suggest placement below the marshmallow M and tray T.

A heat lamp is a suitable heat source because it reaches high temperature quickly and is readily replaced by a user, should the need arise. A presently preferred heat source is a nichrome wire mounted on a mica board; however, the heat source can comprise, by way of example, a ceramic heating element, a heating coil positioned substantially in place of the illustrated heat lamp (the above-referenced Castronuovo patent, U.S. Pat. No. 3,744,403, describes such a heat source in further detail) or can comprise a microwave source oriented toward the marshmallow M and chocolate C. These heat sources are energized using standard household current. A gas burner as the heat source can be selectively fueled by operating a valve connected in a conventional manner between the gas burner and a replaceable butane cartridge.

The toasting and melting operations take place within a heating compartment of the housing. The marshmallow M and chocolate C preferably are separately supported and can be moveable into and out of the heating compartment. Optionally, both of the heating operations can be visually inspected through a window in the housing or in a cover. The cover, if provided, can be movably coupled to the housing and have a closed position for the toasting and melting operations and an open position which provides access to the heating compartment.

The toasting and melting operations take place under control of a heating circuit (not shown). The heating circuit includes the heat source, a circuit breaker (e.g., a fuse), a switch, and a connection to household current for supplying power to the heat source. The heating circuit preferably includes sensors or switches which are connected so as to open the heating circuit and disable the heat source as a failsafe measure in the event of a detected condition. One detectable condition can be that the cover is not in the closed position. For example, a switch can change state when a portion of the cover is not seated in the closed position. The switch's state can be detected and cause the heating circuit to disable the heat source except when the switch state indicates that the cover is in the closed position.

FIG. 1 further shows an optional smoke detector SD included within the housing as part of the heating circuit. The smoke detector SD is positioned to detect a burning condition of the marshmallow M. The smoke detector SD can be operationally coupled to a fan F which comprises a further, optional component that can be included in the heating circuit. The fan F can be arranged to blow air onto the marshmallow at all times that the unit is operational, or to extinguish any burning such as in response to smoke detected by the smoke detector SD, or spin in response to actuation by the user, or blow at all times and be directable onto the marshmallow in response to a user command. In operation, for example, a smoke detector SD can operationally shut-off the heat source by opening the heating circuit in the event that a burning condition is detected, or in the event that a momentary contact switch is actuated by the user to latch the power supply to the fan for a predetermined period of time.

Figure 2:
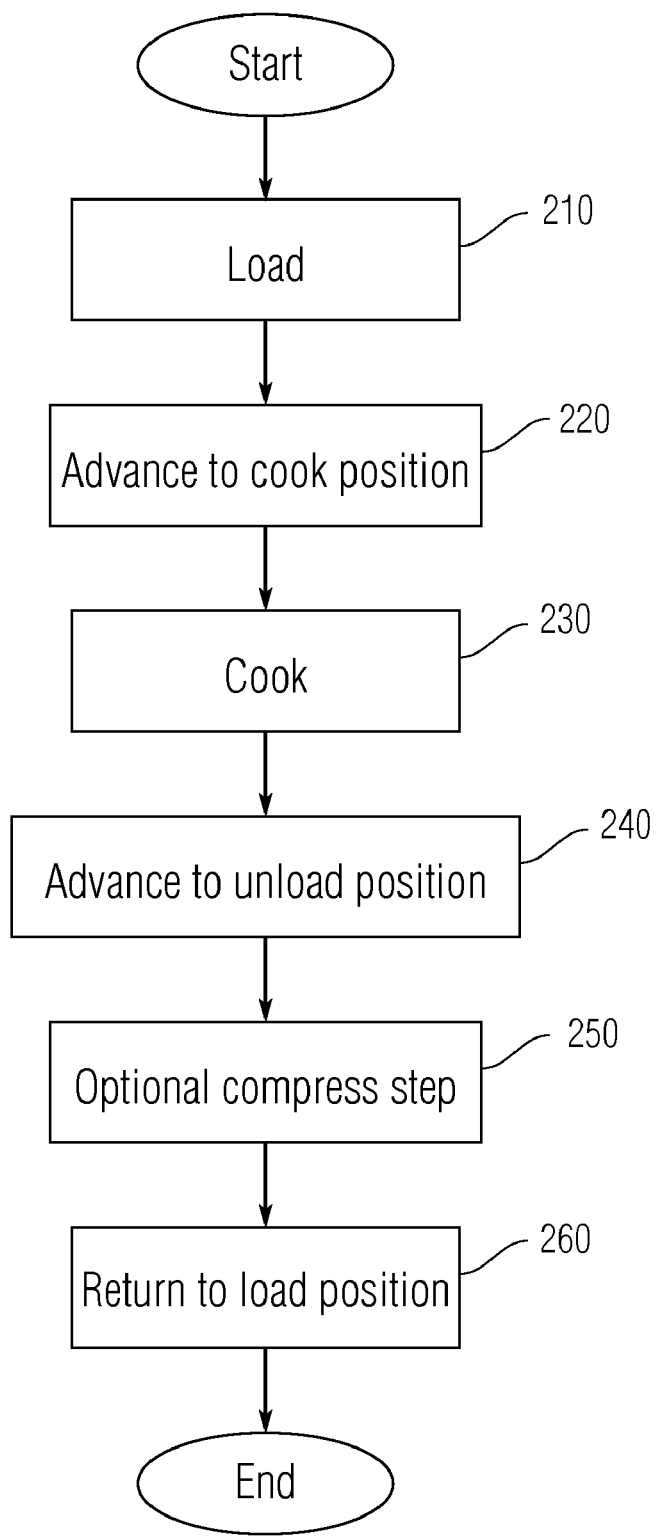
FIG. 2 is a flow diagram outlining the states of a machine operating so as to cook a s'more in accordance with an embodiment of the invention.

Referring now to FIG. 2, a first embodiment of a machine suitable for cooking a s'more is constructed so as to have several states of operation. A user loads ingredients for the s'more, as indicated at block 210. Typically, this includes loading a graham cracker cookie, one or more marshmallows, and chocolate onto support structures described more fully below. One or more of these support structures are then advanced into a cook position, as indicated at block 220. The ingredients are cooked, as indicated at block 230. More particularly, the marshmallow is "toasted" in a toasting operation, by which we mean that it is heated so that its interior softens and optionally so that it's exterior is browned or charred, depending on user preference. Optionally, the cooking at block 230 further includes an active melting or partial melting of chocolate by the heat source in a melting operation. The chocolate can be disposed on the same structure that supports the graham cracker, or can be contained in a crucible for release onto the graham cracker or marshmallow. The toasting and melting operations can occur concurrently. At the conclusion of cooking, which is preferably terminated at the user's discretion, the support structures and accompanying ingredients are advanced to an unload position, as indicated at block 240. This operation can include movement of one or more of the support structures and its respective ingredients into a different position than when undergoing cooking. The operation at block 240 can result in a completed s'more or can facilitate s'more completion by handling and processing the marshmallow M and chocolate C until they reach a toasted and partially melted state, respectively. Optionally, a separate compression step is performed, as indicated at block 250, to press the toasted marshmallow between opposing first and second graham cracker cookies to complete the s'more. The s'more is ready to eat, and can be removed from the machine when the machine is in this state. Notably, the cooking operation is free of any packaging around the graham crackers (e.g., there is no aluminum foil surrounding the ingredients as is necessary when cooking all ingredients in an open fire). The machine returns to the load position, as indicated at block 260 so that the process can be repeated. The process, after loading, can be performed in around a minute.

FIGS. 3A through 3D illustrate, schematically, the movement of several support structures relative to the heat source and locations A, B, B' and C of the housing of a machine constructed to make s'mores in accordance with at least some of the steps outlined in FIG. 2. Mechanical elements have been omitted for sake of simplifying the drawing figures, but certain movements not illustrated in detail should be noted, including the following. The marshmallow pick P is preferably rotationally driven by a motor (see FIG. 1) as well as being mounted on a slide for the translational movement discussed with reference to FIGS. 3A-3D. The tray T is slidably mounted relative to the housing so that it can be placed in an extended position for ready placement or retrieval of a graham cracker or other cookie and be placed in a retracted position such that the marshmallow pick and any marshmallows M thereon can be positioned above any cracker or cookie supported on the tray (see FIG. 4B). The slotted holder SH has a slot which is preferably sized to receive a graham cracker, but can have an adjustable finger A and finger B for supporting crackers and cookies of various dimensions or can be a modular element which can be exchanged for a different holder suitable for the size and shape of a selected cracker or cookie shape. The end view of slotted holder SH illustrates that the cracker is generally exposed on its underside except where gripped by finger A and finger B. This is to permit the upper cracker in the slotted holder SH to engage the marshmallow M, once toasted.

In each of FIGS. 3A through 3D, the heat source is shown schematically to be at position A within the housing. In accordance with one construction of a machine in accordance with the invention, ingredients are loaded on support structures P, SH and T at locations which are remote from location A. This is particularly advantageous for safety reasons when the machine has been in service and the heat source is already hot.

Figure 3A:
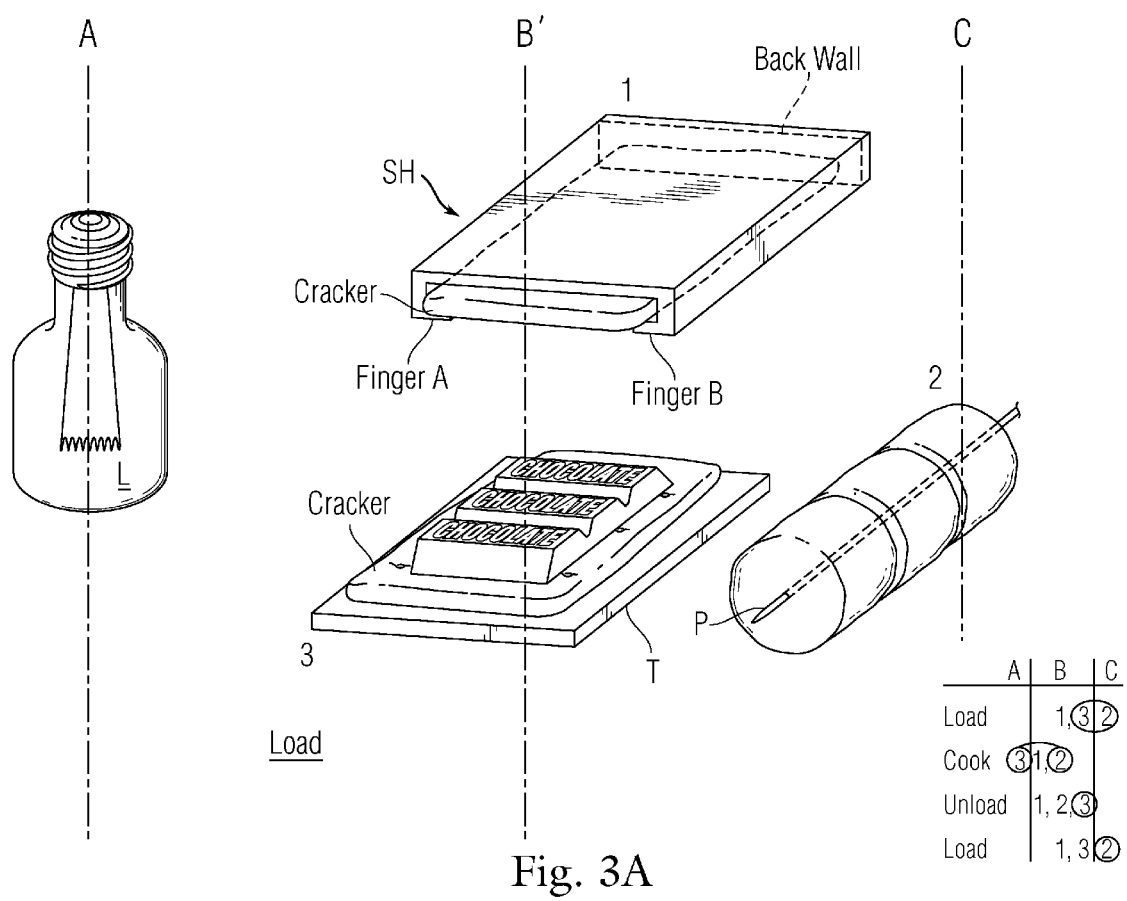
FIG. 3A is a schematic illustration of a loading position of a machine which can be constructed in accordance with the invention.

Referring more particularly to FIG. 3A, three marshmallows M are shown about marshmallow pick P which is supported at location C of the housing. Each marshmallow has been impaled or skewered, in a conventional manner. One end of the pick is mounted to the pick holder (not shown; see FIG. 1) until removed by the user. That end can be held by the user while loading marshmallows on the pick and while transferring a toasted marshmallow into position on or between crackers. The opposite end of the pick has a marshmallow bearing portion. The tip of the pick, adjacent where one or more marshmallows are loaded, can be shaped to have a point. Round skewers made from bamboo can be used as the material for the pick. Wood also can be formed as a round skewer and used as the pick. Both are desirable because they can be handled after the toasting operation (i.e., the material of the skewer does not get too hot during a normal toasting cycle).

A conventional ice-cream stick also can be used as the pick, and is a desirable material to use for the same reason noted above. Such sticks have been used with Popsicle® and Good Humor® brand treats, and generally have dimensions such as 4½ inch long, ⅜ inch wide, and ¹⁄₁₆ inch thickness. Because such flat sticks have a broad support surface, they are desirable to use as the pick because the broad surface helps in preventing a skewered marshmallow from rolling around the stick as the marshmallow softens during the toasting operation.

Figure 1A:
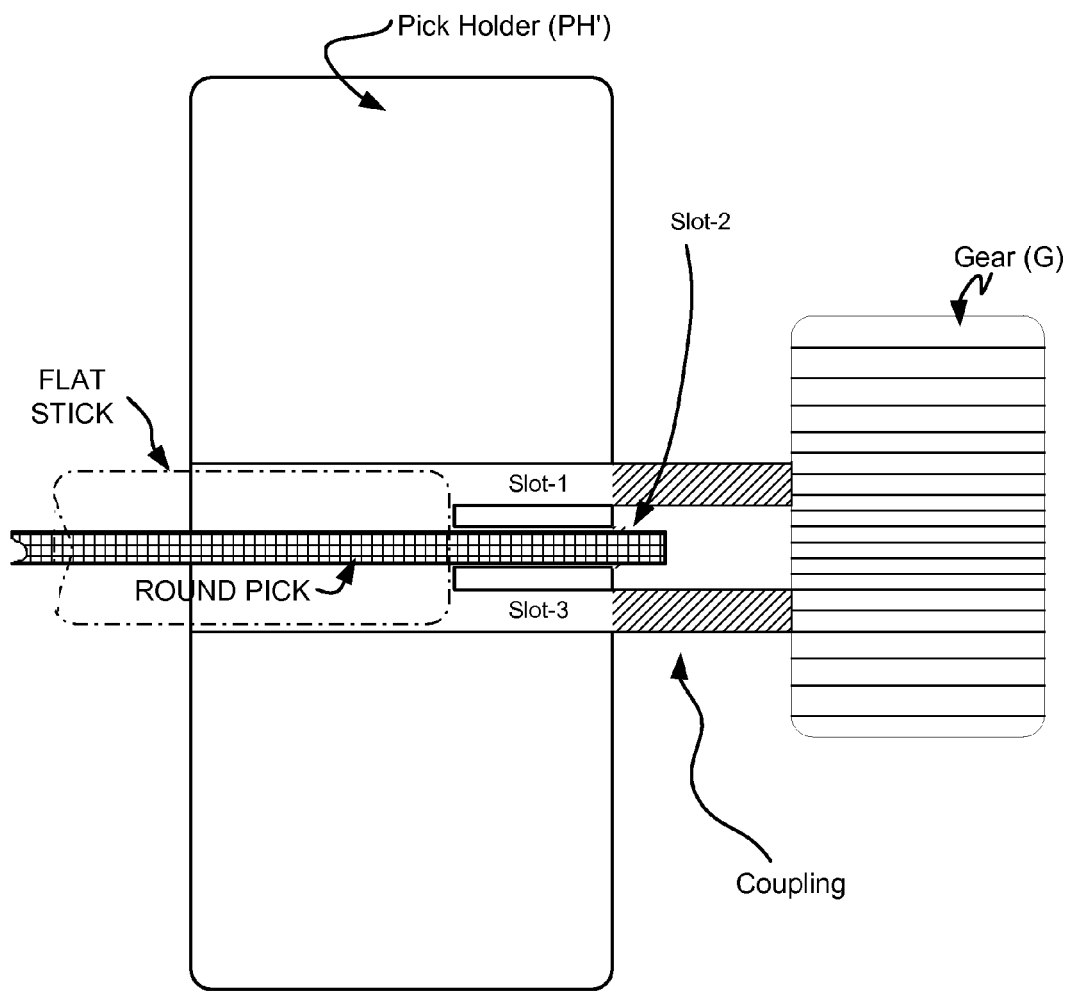
FIG. 1A is a detail view of a pick holder in relation to its coupling to a driving gear wherein the pick holder is adapted to receive picks of different shapes including round skewers and flat sticks.

The pick holder can be configured to receive either a round pick or a flat stick. Turning briefly to FIG. 1A, one half of a pick holder PH' is shown with its coupling to the gear G shown in cross-section. The pick holder PH' has slots 1, 2 and 3 which extend from one side of the pick holder toward the opposite side and communicate with an enlarged slotted-opening which is sized to receive and seat an flat stick (shown in phantom lines). Alternatively, the pick holder PH' can accommodate a single round pick (as shown in slot-2) or two round picks which can be seated in slots 1 and 3, for instance. The other half of pick holder PH' (not shown) can be a mirror image of the view shown in FIG. 1A, or the slots shown in FIG. 1A can be made sufficiently deep to accommodate the flat stick or round pick(s) and the other half of the pick holder can have a flat surface. In use, the coupling to the gear G can drive the pick holder PH' into rotation by any of the motive means discussed above.

A graham cracker cookie is slidably inserted into the slotted holder SH at location B', for example, until it hits a back wall of the holder. The back wall can be spaced from the slot by an amount which is less than the standard length of a graham cracker cookie so as to facilitate removal of the cooked s'more, as described further below. A second graham cracker is disposed on the tray T, also at location B', while the tray is in the extended position. Optionally, chocolate pieces are disposed on top of that graham cracker. The tray T is then returned to its retracted position. The extended and retracted positions are transverse to the housing and therefore are both at location B'. Thus, at this point in the use of the machine, the ingredients for the s'more have been loaded into the machine.

Figure 3B:
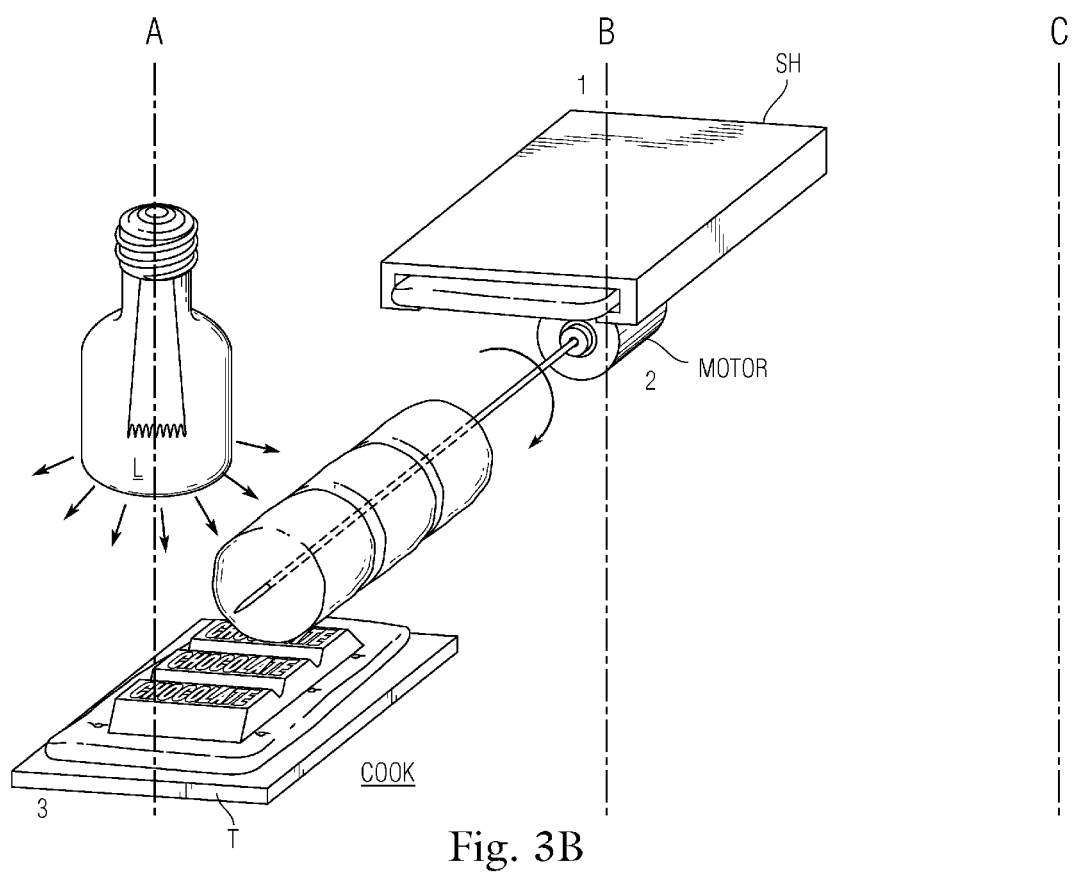
FIG. 3B is a schematic illustration of a cooking position of a machine which can be constructed in accordance with the invention.

FIG. 3B shows the support structures P, SH and T in the cook position. In this position, the marshmallow pick P and its supported marshmallows have been advanced into proximity of the heat source. Specifically, the pick P has moved from location C to location B. In this position, the heating circuit can energize the heat source and the motor acts upon the gear G so as to drive the pick P into rotation. Also, the tray T has advanced from location B' to location A, and thus is disposed below the heat source. This is a preferred position because it permits chocolate supported on a graham cracker on the tray T to be in close proximity to the heat source. As such, the heat source actively melts the chocolate creating a more enjoyable, albeit gooey, treat. However, movement of tray T to location A is not required. Instead, tray T can advance to location B (or remain at location B') and still receive heat from the heat source and its reflector. Likewise, the heat source and/or its reflector can be shaped or oriented to convey heat toward the tray T to melt the chocolate.

It should be noted that location B' preferably is a load/unload location and a second location B is the cooking operation. This can be desirable in order to space the slotted holder SH and the tray T further from the heat source during loading and unloading operations. To simplify the drawing figures, movement between locations B and B' are not shown. Also, in simplified configurations, locations B and B' are the same location.

Figure 3C:
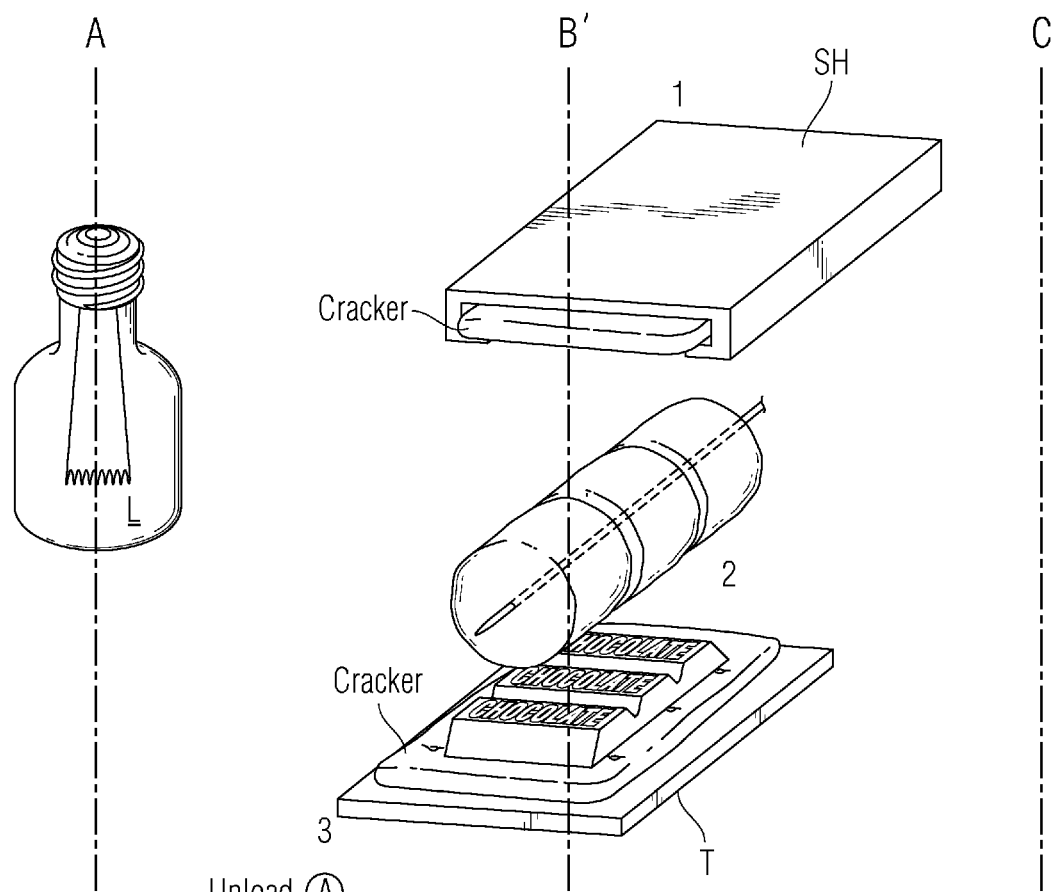
FIG. 3C is a schematic illustration of an unloading position of a machine which can be constructed in accordance with the invention.
Figure 3D:
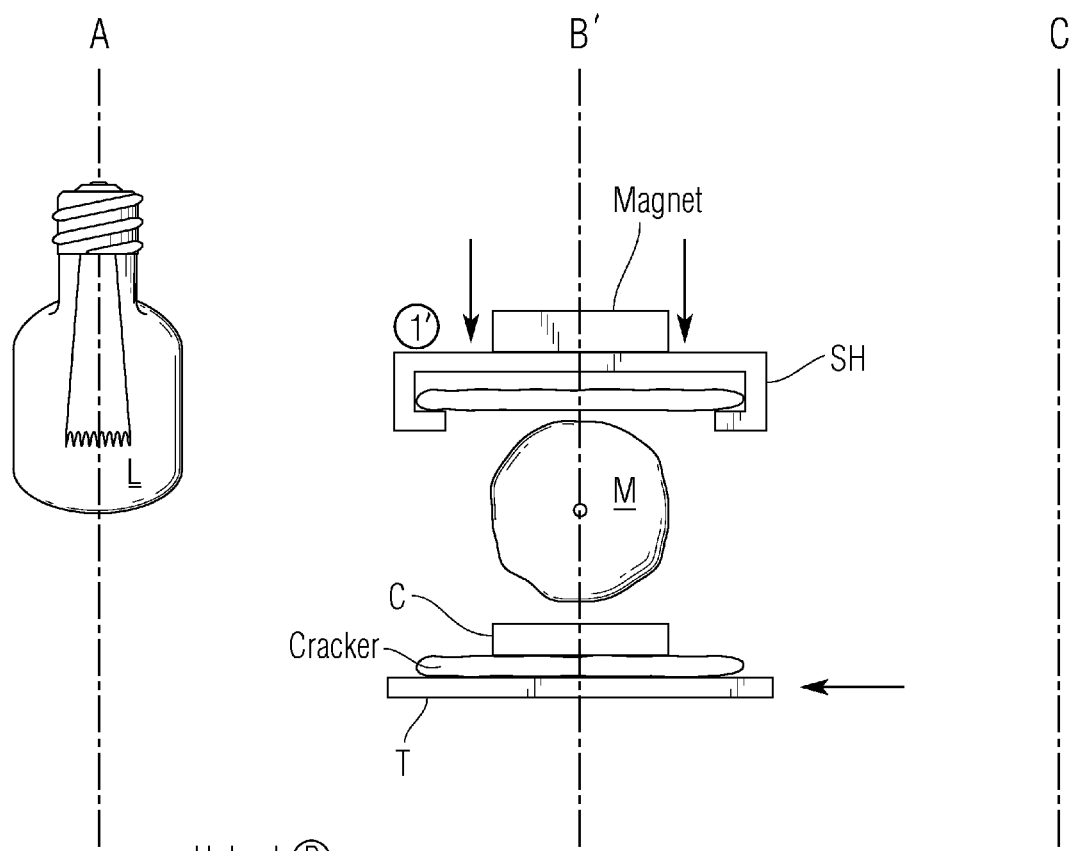
FIG. 3D is a schematic illustration of the unloading position of FIG. 3C, now showing an upper (slotted) holder in a lowered position engaging a toasted marshmallow.

FIG. 3C shows the unload position in which the support structures P, SH and T are all at location B', away from the heat source. FIG. 3D shows the slotted holder SH lowered, e.g., manually against the restoring force of a bias spring, into engagement with the toasted marshmallow. The softened state of the marshmallow and any melting of the chocolate operate to bind the upper and lower crackers and thereby complete the s'more. The s'more can now be slid out transversely by opening the tray T and detached from the slotted holder SH.

Optionally, the slotted holder SH and tray T can be removed from the machine for cleaning. As illustrated in FIG. 3D, the slotted holder can be supported by a magnet or other mechanical coupling, and the tray can comprise a removable pan.

It should be understood that the foregoing is one exemplary construction and that the invention is not so limited.

In a variation of the foregoing, for example, the slotted holder SH can be omitted in its entirety and the machine can operate to load, cook, and unload one or more marshmallows and (melt) any chocolate supported on a single cookie during the heating operation. The s'more can be manually constructed using a second graham cracker by first moving the pick P away from location A (e.g., to locations B' or C) at the end of the cooking cycle and pinching the marshmallow(s) from the pick P between two pieces of the single cookie, or that cookie and a second cookie. In accordance with this arrangement, the machine operates to simultaneously toast one or more marshmallows and actively soften chocolate so as to facilitate a user's putting together a s'more sandwich. Preferably, the chocolate is softened while seated directly upon a graham cracker.

Figure 4A:
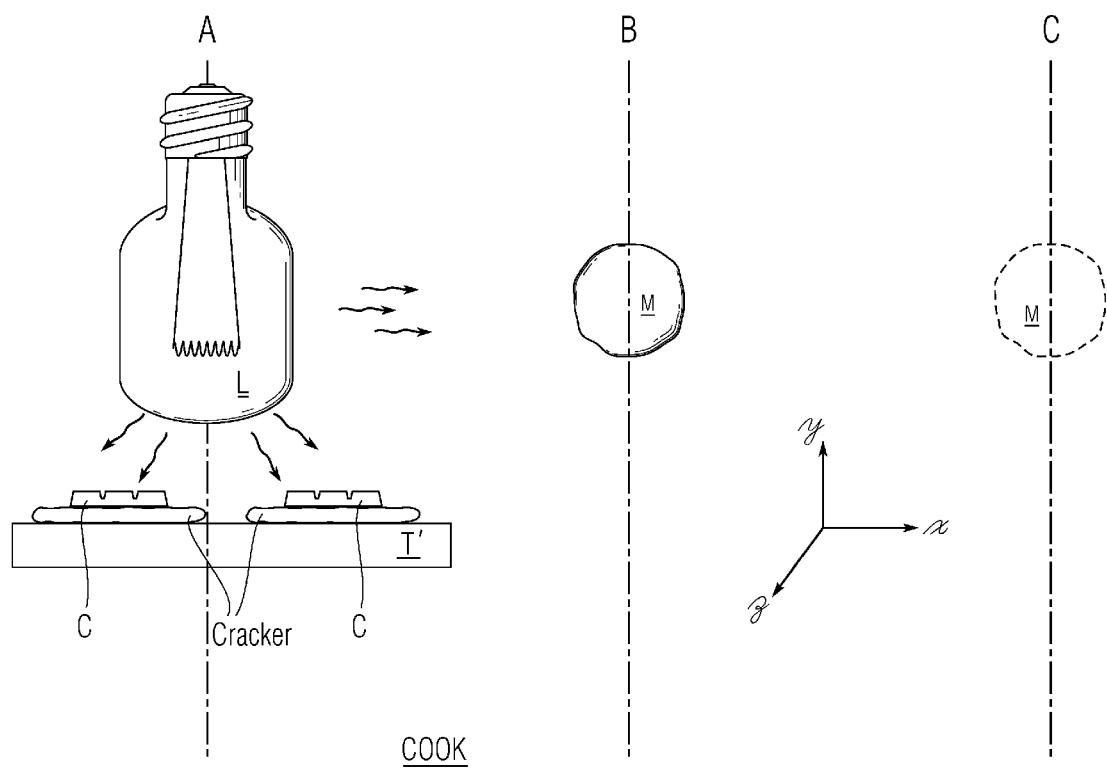
FIGS. 4A and 4B are generally orthogonal views of an alternative embodiment in accordance with the invention in which chocolate and marshmallow support surfaces are moveable toward and away from a heat source, FIG. 4B showing further details of the embodiment.

Optionally, as shown in FIG. 4A, this alternative arrangement can receive plural graham crackers on the tray T', each of which can support chocolate, so that during the toasting and melting operations the graham crackers for each side of the sandwich are concurrently warmed. Any chocolate disposed on either or both crackers is actively softened at the same time that the marshmallow M is being toasted so that the toasted marshmallow(s) M can be slid free of the pick by manually retrieving the two graham crackers, disposing them on either side of the pick, and then pinchedly sliding the toasted marshmallow(s) free from the pick P, so that a gooey, enjoyable treat is retrieved.

Figure 4B:
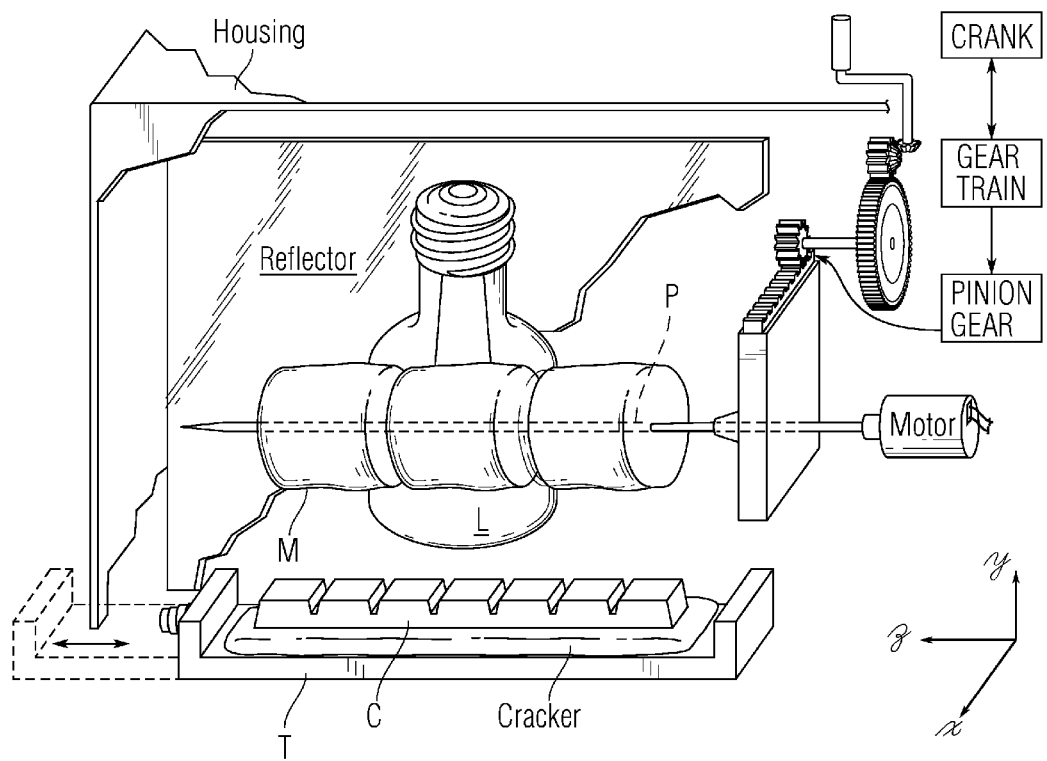

Referring briefly now to FIGS. 4A and 4B, generally orthogonal views illustrate the relative arrangement of the tray T', pick P, and the ingredients supported thereupon. In FIG. 4B, the tray is tray T which differs from Tray T' of FIG. 4A in that it positions a single graham cracker proximate to the heat source rather than the upper surfaces of several graham crackers. FIG. 4B also shows a tray handle suitable for extending and retracting the tray.

FIG. 4B schematically illustrates elements arranged to cause translational movement of the slide that supports the pick P relative to the housing. As illustrated, a manual crank is coupled to a gear train that is selected so as to establish a desired crank-to-pinion turn ratio. The pinion gear cooperates with a rack on one surface of the slide to move the pick P along the x-axis, that is, into and out of proximity with the heat source L. The motor that drives the pick into rotation in this embodiment can be mounted so as to travel together with the slide within the housing. Optionally, the switch within the heating circuit can be closed and opened in response to movement of the slide (or crank). In this way, the heat source is only energized when the marshmallow pick P is moved from its loading location C to a point closer to location A. As noted above, the heating circuit can remain in an open-circuit condition until a cover on the machine's housing is moved to a closed position.

In the foregoing discussion, various support surfaces move into a heating compartment which includes the heat source; however, the invention is not so limited. What is important in regard to the moving support surfaces is that the ingredients are positioned so as to be safely loaded into the machine without requiring a user to come into close contact with the heat source, that is to say, without requiring the user to come as close to the heat source as the ingredients are located during the cooking and melting operations. In this regard, a machine can be manufactured in accordance with the invention which has minimal moving parts while protecting the user from contact with the heat source.

Thus, one variation on the foregoing has the heat source mounted for pivotal, rotational, or translational movement relative to the marshmallow pick P and the tray T, T'. This arrangement eliminates the need for a slide to support the marshmallow pick P, and as a consequence, the pick and its rotational drive mechanism can be secured to a base portion of the housing to thereby provide a stable support for that support surface. Marshmallows M impaled on the pick P rotate in place while the heat source is movable from a remote position (for ingredient loading and unloading) to a proximate position (for cooking). The relative movement as between the heat source and the pick P enables a toasting operation substantially as described above. Further, the tray T, T' can be configured to be a stationary platform for graham crackers and chocolate, with its upper surface accessible to the user whenever the heat source is in its remote position, and is exposed to heat when the heat source is in the proximate position. Again, the relative movement as between the heat source and the tray T, T' enables a melting operation substantially as described above. Preferably, the tray T, T' is constructed so as to have low thermal mass or otherwise be resistant to heating.

As a non-limiting example, a machine can be constructed so as to have a base and an operative upper surface on which the toasting and melting operations are performed, and a retractable heat source which moves along the x-axis to an extended, cooking-position when a cover is in the closed position and retracts preferably prior to the cover being opened. The cover can be manufactured from a plastic material and, if so, should have a high-temperature tolerance for any portion of the cover that is in the vicinity of the heat source. For example, the material can be a polyphenylene oxide plastic with glass filler such as Norel™ available from the General Electric Company.

Figure 5:
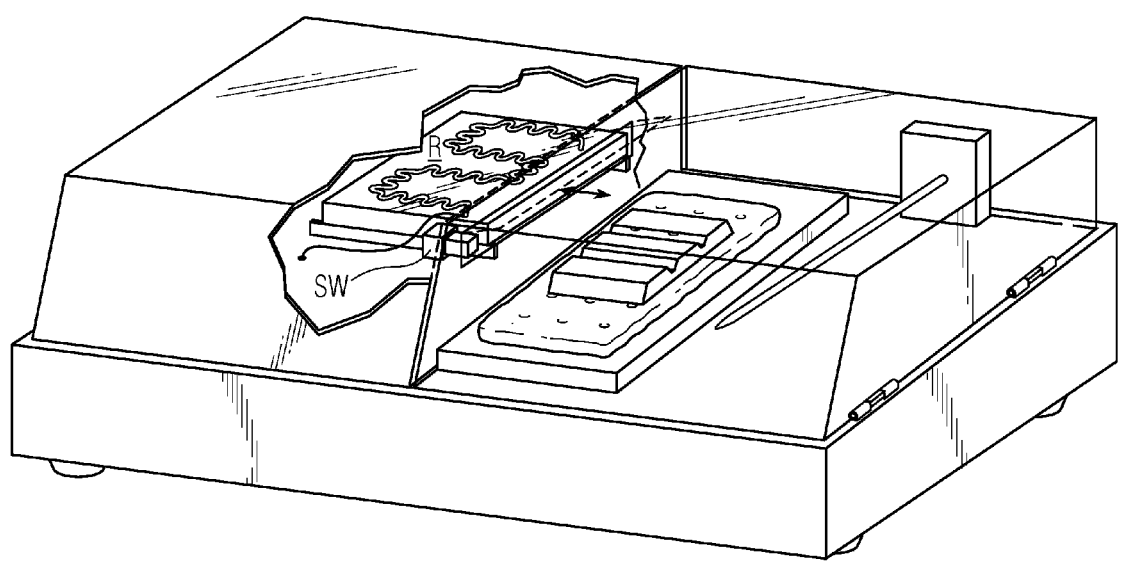
FIG. 5 illustrates a variation of the foregoing in which the heat source is moveable toward and away from the chocolate and marshmallow support surfaces.

As shown in FIG. 5, an embodiment as just described in which the ingredients are supported by statically positioned supports and in which the heat source moves can have a cover that is hingedly connected to the base and provides a visual inspection window for viewing the toasting and melting operations. The pick P and tray T can be as described, except that in this arrangement, neither the pick nor the tray need be translated because the cover is hinged so as to expose both the tray and the pick and permit loading and unloading of ingredients. The switch SW of the heating circuit can sense when the cover is in the closed position and only permit the heating operations when the cover is closed. Further failsafe mechanisms can be provided ensure that the cover cannot be opened until the heat source is fully retracted away from the operative upper surface on which the toasting and melting operations are performed. Optionally, the heat source can be mounted upon or otherwise move in tandem with a reflector R to direct heat toward the ingredients. As in the previous arrangements, the machine operates to toast one or more marshmallows M, preferably while they rotate on the pick P or are mounted to enable controlled rotation by the user, while concurrently melting chocolate disposed on the tray and heating the graham cracker that also can be disposed on the tray.

Figure 5A:
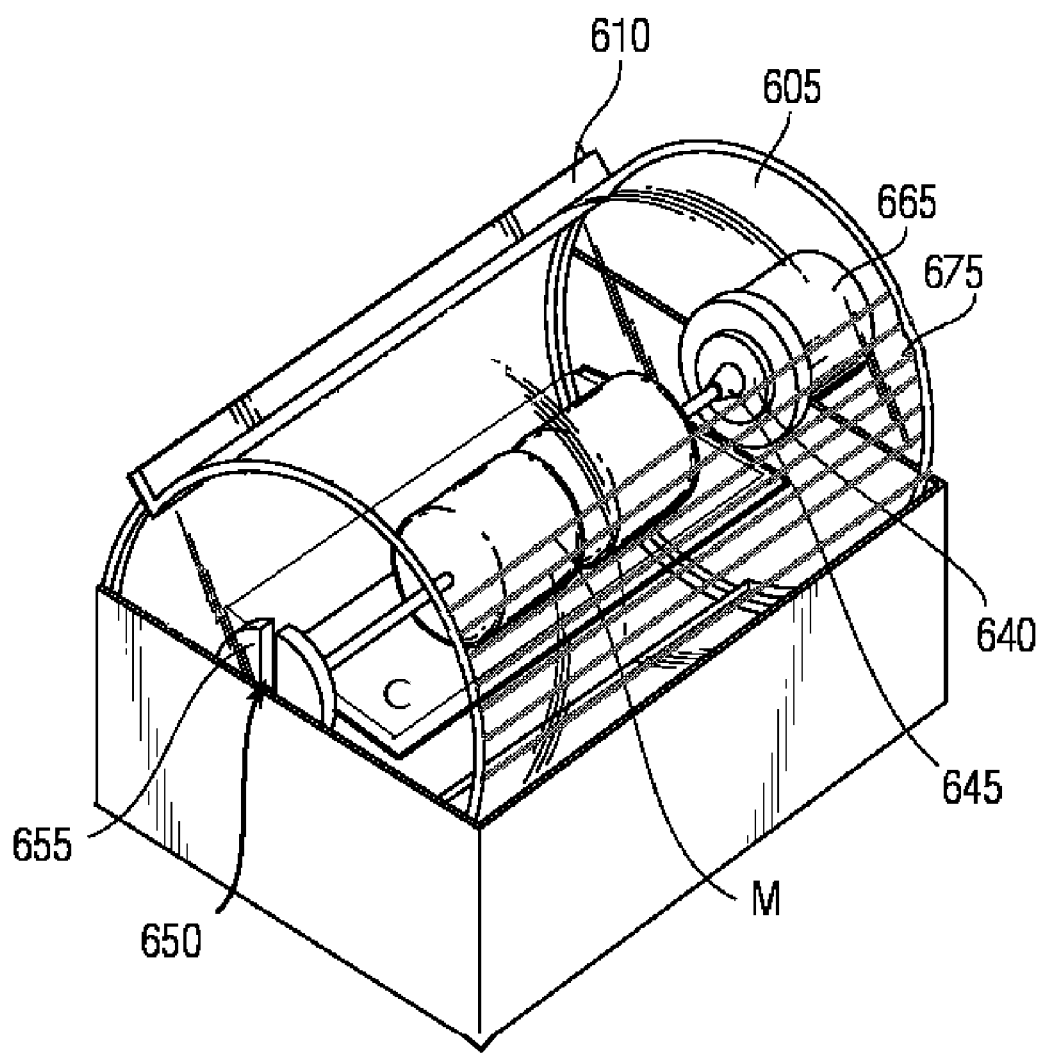
FIG. 5A illustrates another variation in which the heat source moves toward and away from the chocolate and marshmallow support surfaces together with movement of a protective cover.

In, FIG. 5A, the heat source moves toward and away from the chocolate and marshmallow support surfaces together with movement of a protective cover 605. As illustrated, a heat source 675 can comprise nichrome wires supported for movement together with the cover 605. Nichrome wires can be mounted (e.g., wrapped) on a mica board or other insulative support (not shown) or can be included in a solid ceramic or resin component. As illustrated, the heat source 675 is positioned away from the handle 610 so that the cover can be moved from the closed position (as shown) by grasping the handle and moving it clockwise to provide the user with access to the marshmallows M on the pick and chocolate C on its own support together with movement of the cover. Meanwhile, the heat source 675 moves to a second position which is spaced away from the marshmallows M on the pick and chocolate C on its own support. Preferably, the action of opening the cover to provide access to the cooking areas shields the heat source from contact by a user by positioning the heating source below the ingredient supports and out of reach from a user. As described above, a switch (not shown; see FIG. 5) can detect that the cover is not fully seated in the closed position and cause the heating circuit to be disabled.

Optionally, the cover 605 can be an assembly of several components, including an insulated portion which supports the heat source and an inspection portion which includes a window for viewing the toasting and melting operations. The cover assembly can be rigid or hingedly assembled. In response to movement of the handle 610, it is preferable that the portion supporting the heat source be generally shielded from access by a user.

When the cover is in the closed position, heat from the heat source is in direct communication with the marshmallows M on a pick supported by the pick holder 645 and any chocolate C supported on a pan (e.g., a tray such as tray T). The handle 610 can be used to move the cover to an open, lowered position in which the cover 605 is moved out of the way for loading ingredients. For example, the cover can retract into the base of the machine. Thus, the user can have access to the ingredients, both for loading and unloading after the toasting and melting has been performed to any desired degree, but in this embodiment the heat source is stationary and the marshmallow pick holder is in a fixed, but rotatable position. A pick loaded with marshmallows M can be loaded for toasting and removed after toasting without the pick support moving, except possibly for rotation. Graham crackers with or without chocolate C can be retrieved from a stationary tray.

With further regard to the marshmallow support structure, a motive force 665 such as a manual control coupled to a gear, denoted here as gear 640, rotates the gear which in turn rotates a pick holder 645 that snugly fits a pick. The pick supports one or more marshmallows M, and a distal end of the pick preferably is freely supported in a slot 650 of a pick-tip support 655.

Figure 6A:
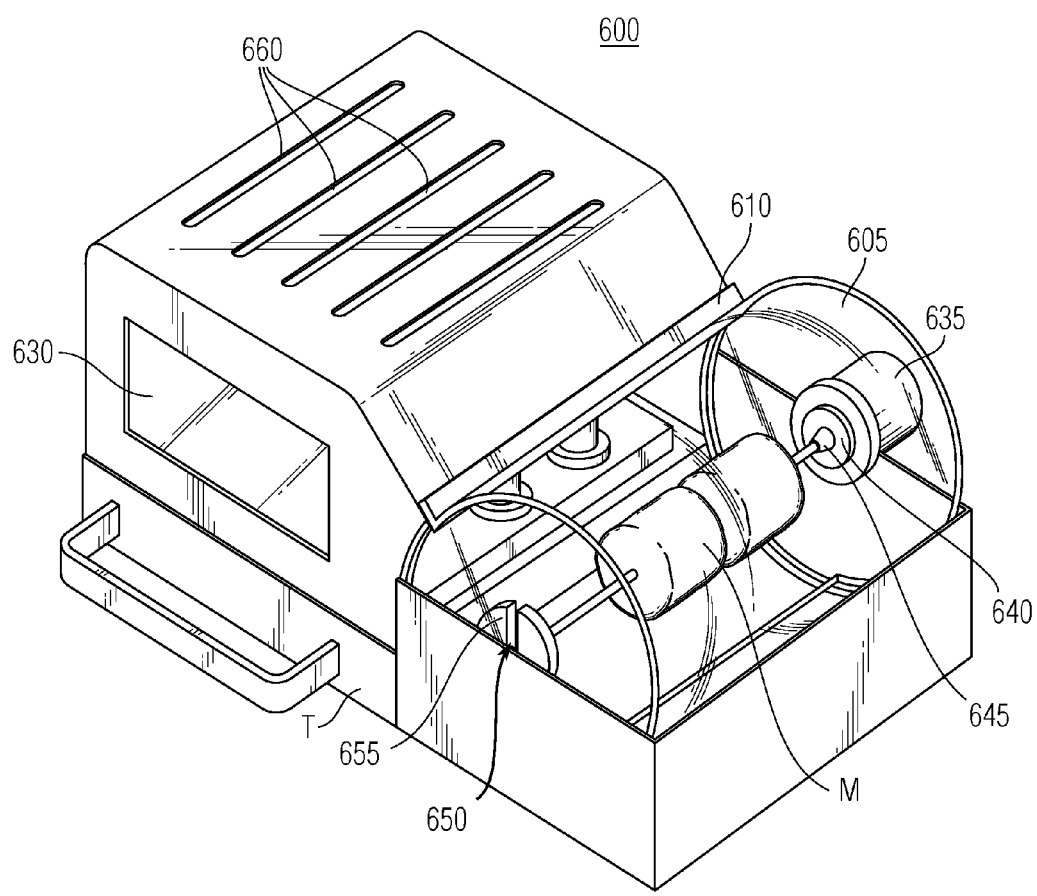
FIG. 6A illustrates a perspective view of a s'mores machine embodiment in which the heat source is stationary.
Figure 6B:
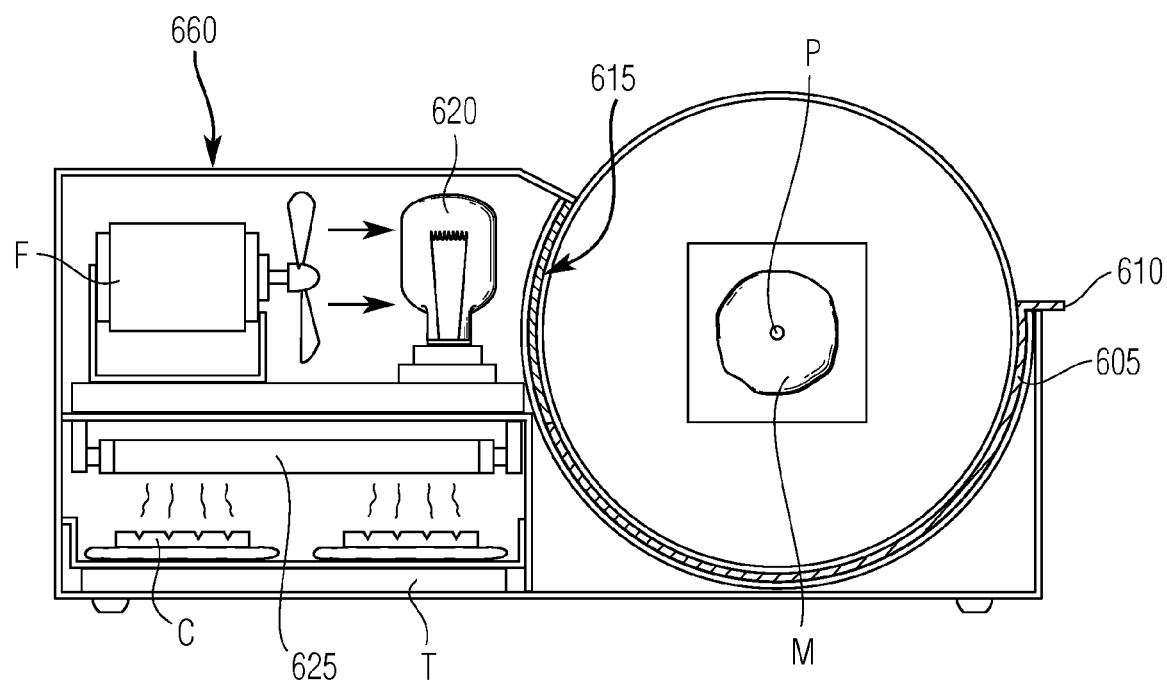
FIG. 6B illustrates the embodiment of FIG. 6A, now shown in cross section.

Another variation on the foregoing has the heat source and the rotatable pick holder mounted in stationary positions relative to the housing and has only the graham cracker support on a moveable tray. In the embodiment of FIG. 6A, a s'more machine 600 has a cover 605 that moves between closed and open positions, with the toasting and melting operations actively taking place when the cover is in the closed position (as shown, and just as in the FIGS. 5 and 5A arrangements). While in the closed position, visual inspection of at least the marshmallows M (and optionally the chocolate C) can be through the cover 605 or a window 630 provided in the housing. With the cover in the closed position, heat from the heat source is in direct communication with the marshmallows on a pick supported by the pick holder and any chocolate supported on the removable pan (e.g., tray T). With the cover in the open position, as shown in FIG. 6B, a handle 610 has been moved to a lowered position and the cover 605 is moved out of the way. For example, the cover can retract into the base of the machine 600. A shield 615 can move with the cover 605 to protect the user from contact with the heat source 620, for example, the shield can be a part of the cover 605. Optionally, a second heat source 625 can be used to melt the chocolate C, or a common heat source can be arranged within the machine 600 to both toast the marshmallows M and melt the chocolate C, as in the previous embodiments. Thus, the user can have access to the ingredients, both for loading and unloading after the toasting and melting has been performed to any desired degree, but in this embodiment the heat source is stationary and the marshmallow pick holder is in a fixed, but rotatable position. A pick P loaded with marshmallows can be loaded for toasting and removed after toasting without the pick support moving, except possibly for rotation. Graham crackers with or without chocolate C disposed upon their upper surface can be positioned on the tray T by sliding the tray into or out of the machine.

As will be appreciated, one of the toasting or melting operations can continue after the ingredients for the other operation have already been removed. Also, the spacing of the tray or pan from the heat source can be adjusted to thereby change the rate of chocolate melting to suit the operator's desires. The adjustment can be accomplished by inserting a suitably-shaped pan or tray T into the s'more machine with its under-side facing upwards, to thereby provide a choice of two height settings.

With further regard to the marshmallow support structure, a motor 635 rotates the gear G, denoted here as gear 640, which supports a pick holder 645 which is shaped to snugly fit a pick P. The pick P supports one or more marshmallows M, and a distal end of the pick preferably is freely supported in a slot 650 of a pick-tip support 655.

Heat from the heating circuit escapes the machine through vents 660. The heating circuit used in the machine 600 can be interrupted by an un-engaged contact switch, such as switch SW in FIG. 5, when the cover 605 is displaced from its closed position (as shown in FIG. 6A).

Optionally, a fan F can be energized to extinguish a flaming marshmallow, which may happen during the course of a toasting operation, by blowing upon the marshmallow. Instead of a fan F, a bellows B can be mounted on the housing and have an outlet arranged to convey a pulse of air, in response to a manual contraction of the bellows, to the marshmallow-bearing portion of the pick P such as through an air duct or a passageway within the housing.

The position and arrangement of the elements described above can be varied in a commercial embodiment of the invention from what has been described above in connection with this and other embodiments.

While it is desirable to rotate the marshmallow during the cooking cycle, this can be achieved using a powered motive source (e.g., a motor) or a manual control element. In one implementation, the pick holder can be rotatably mounted and coupled to a rotatable knob, directly or through intervening gears, so that a user can rotate the knob and cause the pick holder to rotate. In another implementation, a rotatably mounted pick holder can be rotatably coupled to a slidable control which, directly or through intervening gears, allows the user to set the pick holder in rotating motion. Thus, for example, the pick holder can be mounted on the gear G and the teeth of the gear can serve as a pinion that cooperates with a rack attached to the slideable control. Movement of the slideable control causes the rack to shift leftwards or rightwards and cause the teeth of the gear G to spin clockwise or counterclockwise and setting the pick in a corresponding rotational movement (or opposite rotation depending on whether there are any intervening gears). Also, the motive source can be harnessed from the fire-extinguishing fan F. For example, the gear G can have impellers disposed within the air stream flow of the fan F which sets the pick holder in motion. A lever can adjust the amount of air impinging on the impellers and thereby control the rate of rotation of any pick and marshmallows engaged to the pick holder. Meanwhile the same or another portion the air stream can be manually redirected toward the marshmallows to extinguish any flames. One advantage of this arrangement is that the fan is already spinning at full speed at the time that it is needed to extinguish any flame.

In an embodiment of the invention, the fan spins at all times yet its air flow is nominally directed away from the marshmallow, such as by a damper, or by a damper connected to a leaf spring that biases the damper to a particular position. A control on the machine such as a button can be coupled to the damper to redirect air flow onto the marshmallow to rapidly extinguish any burning. Instead of a damper, the fan itself can be mounted for pivotal or translational movement so as to selectively direct a forced air stream onto a marshmallow to extinguish or prevent any burning. In either case, the housing can include a channel or slot that directs or concentrates an air stream across the surface of any marshmallow supported on a pick mounted to the pick holder.

Insulation is preferably provided around elements adjacent to or in temporary proximity to the heat source to minimize temperature fluctuations during use.

Several of the features of one embodiment or arrangement described herein can be used in other embodiments or arrangements to equal advantage and the foregoing specification should be read with that understanding.

While the present invention has been described with respect to a certain embodiments thereof, it is not so limited. The detailed description is presented to enable one of skill in the art to practice the invention and to disclose the best mode known to the inventors as of the date of filing this patent application. The invention more broadly encompasses systems and methods defined by the recitations in the claims appended hereto or to be appended hereto and the equivalents of such recitations, and is not restricted to the description of any particular embodiment or alternative arrangement described herein.

We claim:

1. A s'more machine for toasting a marshmallow loaded on a marshmallow-bearing portion of a pick and for at least partially melting a chocolate bar, comprising:
    a housing;
    a heat source within the housing;
    a gear;
    a rotatable pick holder supported by the gear and shaped to removably and securely receive and seat a first end of the pick and support the marshmallow-bearing portion in proximity to the heat source;
    a manual control configured to move in a slideable manner by a person exteriorly of the housing;
    a rack attached to the manual control disposed so as to provide a coupling between the rotatably mounted pick holder and the manual control, whereby slideable movement of the manual control shifts the rack and causes corresponding rotational movement of the gear to spin and thereby set any pick engaged to the pick holder into rotation; and
    a second support surface, different than the pick, disposed so as to support a chocolate bar within the housing and in proximity with the heat source,
    whereby any marshmallows on the pick are toasted by the heat source concurrently with an active melting of any chocolate bar on the second support surface into a softened or partially liquid state and the user rotates the marshmallow-bearing portion of the pick by way of the coupling to the manual control without having contact with the first end of the pick thereby fostering safety for home use.

2. The s'more machine of claim 1, further comprising a vent and a smoke filter disposed within the housing proximate the vent to constrain any release of smoke due to the heat source toasting the marshmallow.

3. The s'more machine of claim 1, further comprising a channel sized to receive a second end of the pick opposite the first end, the channel being linearly spaced from the pick holder and loosely supporting the second end of the pick throughout any rotation by the coupling.

4. The s'more machine of claim 1, wherein the rotatable pick holder has first and second slots therein, the first slot being shaped to receive the first end of a pick having a round cross section and the second slot being shaped to receive the first end of a pick having a rectangular cross section.

5. The s'more machine of claim 1, further comprising a bellows having an outlet oriented so as to convey a pulse of air to the marshmallow-bearing portion of the pick in response to a manual contraction of the bellows.

6. The s'more machine of claim 1, wherein the second support surface is movably positionable between a first position exterior of the housing in which a chocolate bar is loadable onto the second support surface and a second position interior of the housing in which the support surface is proximate the heat source.

7. The s'more machine of claim 6, wherein the second support surface is slideably positionable between the first position and the second position independent of any movement of the pick holder.

8. The s'more machine of claim 1, further comprising a cover coupled to the housing and movable from a closed position to provide access to the pick holder.

9. The s'more machine of claim 8, further comprising a heating circuit having a switch responsive to movement of the cover so as to open the heating circuit and thereby disable the heat source except when the cover is in the closed position.

10. The s'more machine of claim 9, wherein the housing comprises a base wherein the heat source is mounted on the cover and moveable therewith so as to be in proximity with the marshmallow-bearing portion of the pick when in the closed position and to retract into the base of the housing when in the open position.

11. The s'more machine of claim 1, further comprising a tray removably seatable directly upon the second support surface and shaped to support the chocolate bar thereon.

12. The s'more machine of claim 1, further comprising a catch means for receiving any marshmallows that fall from the pick, the catch means being removably seated within the housing below the pick.

13. The s'more machine of claim 1, further comprising a fan operatively connected to provide an air stream and a channel that selectively directs the air stream across the surface of any marshmallow to extinguish any burning of the marshmallow in response to a control.

14. The s'more machine of claim 1, wherein the manual control is coupled to the pick holder by a slideable rack that has a gear ratio that provides a rate of rotation for a given movement of the coupling.

15. The s'more machine of claim 1, wherein the heat source is mounted within the housing for pivotal, rotational or translation movement relative to the pick to provide a remote position that is remote from the marshmallow for safe loading and unloading of the marshmallow onto and off of the pick, respectively, and a proximate position that is proximate to the heat source.

16. The s'more machine of claim 1, wherein the gear and the rotatable pick holder are mounted for movement into and out of proximity of the heat source.

* * * * *